Nov. 5, 1963   D. E. WOESSNER   3,109,986
FIELD GRADIENT MEASUREMENT OF SELF-DIFFUSION CONSTANT
Filed June 28, 1960   2 Sheets-Sheet 1

DONALD E. WOESSNER
INVENTOR.

Nov. 5, 1963  D. E. WOESSNER  3,109,986
FIELD GRADIENT MEASUREMENT OF SELF-DIFFUSION CONSTANT
Filed June 28, 1960  2 Sheets-Sheet 2

DONALD E. WOESSNER
INVENTOR.

BY D. Eue Richards 3,109,986
FIELD GRADIENT MEASUREMENT OF SELF-DIFFUSION CONSTANT
Donald E. Woessner, Dallas, Tex., assignor to Socony Mobil Oil Company, Inc., a corporation of New York
Filed June 28, 1960, Ser. No. 39,294
6 Claims. (Cl. 324—.5)

This invention relates to nuclear magnetic resonance and more particularly to the determination of the self-diffusion constant.

It has been found that materials which may be polarized in a magnetic field exhibit a macroscopic magnetic moment. The nuclei in such materials may then be forced into motion in such magnetic field. The detection of such motion under certain conditions can yield useful information as to the character of the material. Such nuclear magnetic resonance techniques have been disclosed in U.S. Patent No. 2,561,489 to Bloch et al.

It has been found that the self-diffusion constant of a material is a characteristic upon which identity may be based. For example, in distinguishing between crude oil and water, the former has a self-diffusion constant of the order of $2 \times 10^{-6}$ cm.$^2$/sec. The latter has a self-diffusion constant of the order of $2.3 \times 10^{-5}$ cm.$^2$/sec. As a basis for establishing identity of nuclei an accurate measure of the self-diffusion constant of such materials is of importance.

In accordance with prior techniques, self-diffusion measurements have been accomplished by polarizing a material in a unidirectional magnetic field having a gradient therein and generating pulsed magnetic fields oriented at an angle to the polarizing field. Free precession echo signals are produced which vary in amplitude in dependence upon the self-diffusion constant and upon the time interval between applied magnetic fields.

Applicant has found that self-diffusion constants can be measured more readily by maintaining such time intervals constant and by varying the gradient of the polarizing magnetic field within controlled limits so that the self-diffusion constant can be determined.

More particularly, in accordance with the present invention there is provided a method of determining the self-diffusion constant of a material having nuclei thereof which are polarized in a unidirectional magnetic field having a gradient therein. A first pair of magnetic fields is generated having a given orientation angularly disposed relative to the unidirectional magnetic field to produce a first free precession echo signal. A first output signal is produced in response to detection of such echo signal and is registered. The gradient of the unidirectional magnetic field is then changed and a second pair of magnetic fields is then generated having the same orientation as the first pair to produce a second free precession echo signal. The latter signal is then detected to produce a second output signal. Functions are then recorded which are proportional to the logarithm of the amplitudes of the first output signal and second output signal. They are recorded or registered in correlation with functions representative of the square of the field gradient whereby the slope of the data thus registered is proportional to the self-diffusion constant of the material.

In a further aspect of the invention, there is provided a system in which nuclei of the sample of material are polarized in a unidirectional field and which includes in combination a first coil means for establishing magnetic fields in the material at a substantial angle to the unidirectional magnetic field. The coil means also serves to detect echo signals due to precession of said nuclei. A measuring means is connected to said first coil for measuring a signal representative of the amplitude of the echo signal. Control means is provided for producing variation in the gradient of the unidirectional magnetic field and for producing echo signals following application of magnetic fields angularly disposed with respect to the unidirectional magnetic field. Means are then provided for registering the latter signals.

For further objects and advantages of the present invention, reference may now be had to the following description taken in conjunction with the accompanying drawings in which.

Figure 1:
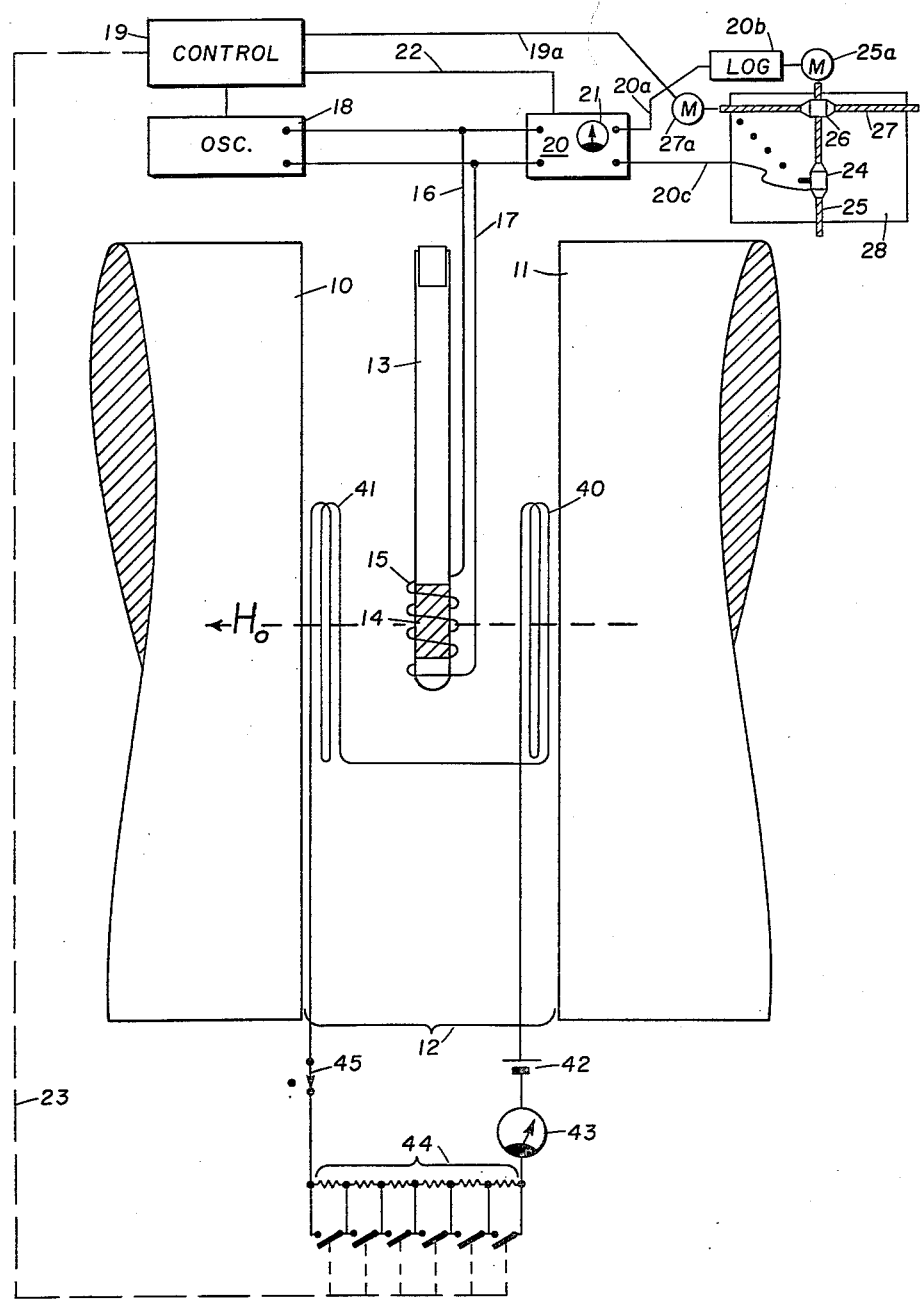
FIG. 1 is a diagrammatic representation of a system embodying the present invention.

The present method and system for measuring the self-diffusion coefficients of certain liquids makes use of the attenuation of spin-echo amplitudes resulting from the diffusion of molecules into regions having different values of magnetic fields. In the system of FIG. 1, a magnetic field of magnitude $H_0$ is produced by an electromagnet having opposed poles 10 and 11. An air gap 12 between the faces of poles 10 and 11 is traversed by magnetic flux. A sample holder 13 is supported in the air gap 12 and contains in the lower end thereof a quantity of sample 14, the self-diffusion constant of which is to be measured. A coil 15 of cylindrical form encompasses the sample 14. Coil 15 is connected by conductors 16 and 17 to a pulse source 18 actuated under the control of unit 19. The coil 15 is also connected to a receiver system 20.

Figure 2:
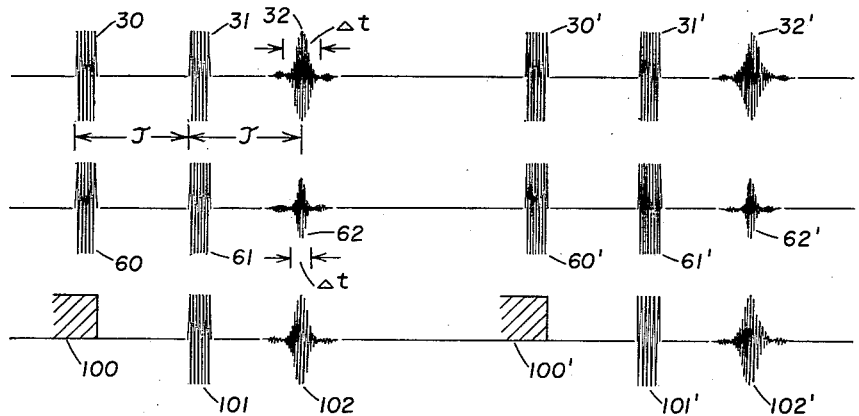
FIG. 2 illustrates time relationships between pulses produced in the system of FIG. 1.

Referring to FIG. 2, alternating current pulses 30 and 31 are applied to coil 15 from oscillator 18 under operation of control unit 19. Upon excitation of coil 15, alternating magnetic field pulses are produced which are perpendicular with respect to the field $H_0$. The pulses are of a duration $t$ and are spaced apart a time interval $\tau$. Following the application of the second pulse 31 by time interval $\tau$, nuclei in sample 14 having a magnetic moment precess under the influence of field $H_0$ and attain a condition of phase coincidence at a time $\tau$ so that an echo pulse 32 may be detected in coil 15. By repeatedly applying pulses such as pulses 30, 30', etc., a series of pulses 32, 32', etc. will be produced and applied to the receiver 20. It is known in the art to measure the amplitude of pulse 32 for measurement of the transverse relaxation time $T_2$ of sample 14.

In contrast with the prior art, a first set of measurement is made for registration or indication by meter 21 of the amplitude of pulse 32. Thus, the receiver 20 may comprise a peak-reading voltmeter suitably gated from control unit 19 by way of channel 22. By this means, the reading on meter 21 is proportional to the amplitude of pulse 32.

In accordance with the present invention, measurements of the spin-echo pulse are made under varying, but known, conditions of field gradient through the sample 14. More particularly, a pair of secondary field coils 40 and 41 are employed. The coils 40 and 41 are positioned in the air gap 12 and in axial alignment along the field $H_0$ and with the center of the sample 14. The coils 40 and 41 are connected in series opposition and are excited from a battery 42 interconnected by way of ammeter 43, control network 44, and switch 45. With switch 45 closed, current flowing from battery 42 through coils 40 and 41 alters the magnetic field in the region of sample 14.

Figure 3:
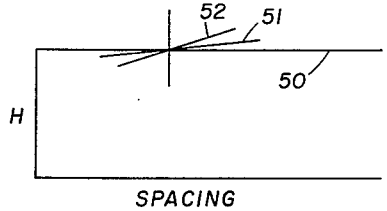
FIG. 3 is a graph of field strength in the area of the sample of FIG. 1.

Referring to FIG. 3, there has been plotted magnetic field intensity H as a function of the distance across the air gap 12. The line 50 may be taken as representative of the magnitude of the field $H_0$ produced by the magnetic forces associated with poles 10 and 11. With the switches in control unit 44 in one position and switch 45 closed, current flowing through coils 40 and 41 produces a first gradient which preferably is linear across the sample 14 and which is represented by the line segment 51. Under such condition, pulses 32, 32' are obtained and the amplitude thereof is measured and/or indicated by receiver 20 and meter 21. Thereafter, switches in control unit 44 are actuated so that a different current flows through coils 40 and 41. As a result, the magnetic field gradient across the sample 14 will be altered to a second condition which may be represented by line 52 which differs in slope from lines 50 and 51 in dependence upon the current flow through coils 40 and 41. Under such condition, a second series of excitation pulses 60, 61, 60', 61' are applied to coil 15. Echo signals 62, 62' are then detected in coil 15 and are registered by receiver 20. The difference between the amplitudes of echo pulses 32 and 62 is dependent upon the magnetic field gradients across sample 14. The maximum amplitude for a particular echo signal following any two-pulse sequence occurs at time $t=2\tau$. The amplitude of the echo signal is given by the following expression:

$$E = E_0 f(2\tau) \exp\left(-2\gamma^2 G^2 \tau^3 \frac{D}{3}\right) \quad (1)$$

in which:

$E_0$ is a constant dependent upon the geometry and other constants of a nuclear magnetic resonance system;
$f(2\tau)$ is the function which describes the effects of nuclear spin relaxation and spin-spin coupling;
$\gamma$ is the nuclear gyromagnetic ratio;
$G$ is the magnetic field gradient through the sample along the direction of the magnetic field $H_0$;
$\tau$ is the time interval between pulses; and
$D$ is the self-diffusion coefficient.

In accordance with the present invention, the value of $\tau$ is held constant for all series of pulses and the amplitude E of the spin-echo signal is measured as a function of field gradient G. The value of the self-diffusion coefficient may then be calculated from the slope of a plot of the logarithm of the amplitude E as a function of gradient squared ($G^2$).

Automatic operation may be carried out under the direction of the control unit 19. A control linkage 23 extends between control unit 19 and the switches in the unit 44 so that a step-wise variation will be produced in the current flowing through coils 40 and 41 by sequential actuation of the switches in unit 44. A recording system is provided which includes a recording element 24 mounted on a spiral positioning element 25 which in turn is mounted in a follower 26. Follower 26 is mounted on a spiral element 27. A motor 25a drives spiral 25 and a motor 27a drives spiral 27 so that the recording element 24 may be positioned at any coordinate point on the recording chart 28. Circuit 19a is calibrated in terms of the current flowing in coils 40 and 41 as to apply a positioning function to motor 27a from control 19 so that the lateral position of the follower 26 may be proportional to the square of the gradient through sample 14. Circuit 20a leads from the receiver 20 to logarithmic amplifier 20b which drives motor 25a to position the recording element 24 along an ordinate of the chart 28 representative of the logarithm of the amplitude of the pulse measured. Circuit 20c extends from receiver 20 to recorder 24 to effect a recordation of data in timed relationship to the measurements made under the control of unit 19. By this means, a sample may be placed in tube 13; and control unit 19, following a preset program, will cause a series of data points to be printed on chart 28 which represent the variation in the amplitude of pulse 32 as a function of the gradient of the magnetic field through the sample. As illustrated in FIG. 1, an increase in field gradient causes a decrease in pulse amplitude. The data thus derived from operation of the system will be plotted with the logarithm of amplitude being a linear function of the gradient squared. It will be appreciated that recording potentiometers, such as sold by Minneapolis Honeywell Regulator Co., Philadelphia, Pennsylvania, and identified as "Electronic" Strip Chart Recorders, with a suitable printing head may be employed for recording the data as above described. However, the foregoing has been presented merely by way of illustration so that the functional relationships involved may be portrayed.

This method of measuring the self-diffusion constant has been found to be highly advantageous over prior art methods in that a simple adjustment in the system may be made to effect the necessary variation in measurement. More particularly, in prior art systems the pulse interval $\tau$ was changed as well as the time constants of the measuring system 20 in order accurately to record the signal upon which computation could be based. However, in the present system, all critical elements may be fixed. The selective closure of switches in control unit 44 is the only variation necessary.

In one system employed for measuring the self-diffusion constant, a magnetic system having six-inch pole faces was employed with a magnetic field of 6,220 gauss. The gradient was produced in such field by the use of coils 40 and 41, each of which comprised 120 turns of number 28 copper wire positioned on opposite sides of the sample adjacent to but spaced about one-fourth inch from the pole faces. The air gap 12 was of the order of two inches in length. The values of the resistances in control unit 44 were selected so that an adequate number of reasonably uniformly-spaced values along the gradient scale ($G^2$) were available. The combined resistances of all elements in control unit 44 were about twice the combined resistances of coils 40 and 41. Currents employed were of the order of a few tenths of an ampere.

In the system above described, the magnetic field gradient through sample 14 was determined to be about twenty-two gauss per centimeter when current through coils 40 and 41 was one ampere. The resistance elements in unit 44 were varied so that the field gradient was varied through a range between twenty-two gauss per centimeter and zero so that sufficient data were obtained to determine the slope of the variation in amplitude with field gradient squared.

The sample 14 was placed in a tube of diameter $d = \frac{1}{4}$ inch. When the product of gradient G times tube diameter $d$ becomes substantial, the amplitude of echo signals 32, 62 will be substantially decreased because not all nuclei are nutated through the same angle by application of pulses 30 and 31. Experimental measurements indicate that the numerical coefficient of the exponential in Equation 1 is independent of the angles of nutation produced by application of pulses 30 and 31 and the deviations from exact resonances. However, an excessive value for the product $Gd$ is important in the present invention because the amplitude of the pulse echo signal is not so independent. For very short values of time $\tau$, those values in which the exponential in Equation 1 is unity, the amplitude of the echo signal 32, 62 has been measured as a funtion of the ratio $$\frac{Gd}{H_1}$$

where $H_1$ is the amplitude of one rotating component of the A.C. pulses 30 and 31. The decrease of the amplitude of the echo pulses 32, 62 is five percent when the function $$\frac{Gd}{H_1} = 1$$

This decrease varies in accordance with the expression $$5\left(\frac{Gd}{H_1}\right)^2$$

up to the point $$\frac{Gd}{H_1} = 3$$

Thus, it is evident that any error introduced by selection of parameters may be rendered negligible if the factor $H_1$ is several times larger than the product $Gd$.

It has been found necessary to employ magnetic field gradients of substantial magnitude where the self-diffusion coefficients of liquids have either short values of transverse relaxation time $T_2$ or have small self-diffusion coefficients.

Figure 4:
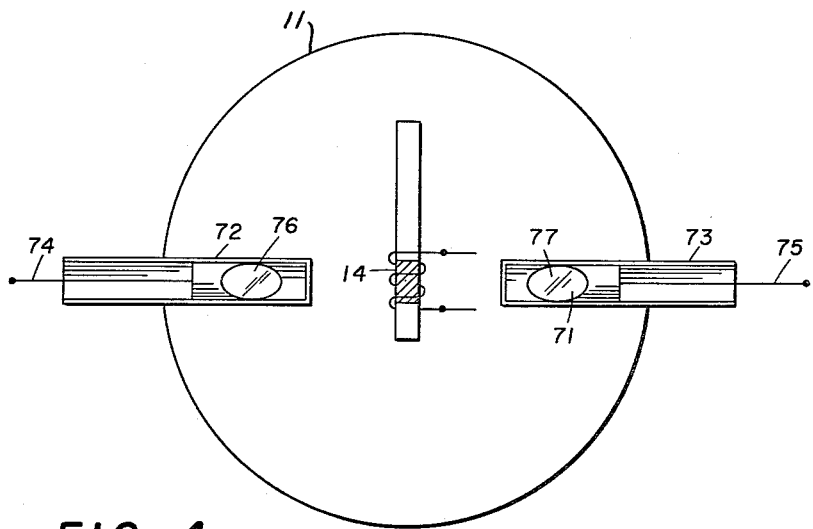
FIG. 4 illustrates a modification of the invention.

The method of the present invention was illustrated through using the instrumentalities of coils 40 and 41, FIG. 1, to vary field gradients between at least two different values for modifying the amplitude of nuclear magnetic resonance echo signals. It will be recognized that other suitable means may be employed for modifying the field gradient. For example, as illustrated in FIG. 4, cylinders 70 and 71 of magnetic material positioned in nonmagnetic tubes 72 and 73, respectively, may be moved manually by means of handles 74 and 75 into different positional relationship with respect to sample 14, thereby to alter the magnetic field gradient across the sample 14. It has been found preferable to modify the field across sample 14 while maintaining a linear gradient. Thus, in FIG. 4, the magnetic elements 70 and 71 have beveled faces 76 and 77 so shaped that movement toward or away from sample 14 will maintain linear the gradient in flux through sample 14.

It will be readily appreciated that other modes of variation in field gradient may be employed. Thus, applicant's method is not limited to a particular apparatus but may be performed at least by hand through the actuation of handles 74 and 75. It may be carried out at least in part by the manual control of switches in control unit 44. Alternatively, the control unit 19 may be provided with a suitable linkage 80 leading to the switches in control 40 for automatic variation of the gradient through sample 14.

While it will be preferred that the magnitude of the gradient through sample 14 be known, calibration procedures may be employed to yield useful measurements even though the exact value is not known. However, to obtain the value of the gradient, the coils 40 and 41 may be calibrated by using a cylindrical sample 14 of diameter $d$ and measuring the time interval $\Delta t$, FIG. 2, between the phase minima on each side of the spin-echo signal 32 and using the relationship $$G = \frac{15.33}{\Delta t \gamma d}$$

The foregoing relationship is understood by those skilled in the art as indicated by a paper published in Physical Review, 1954, volume 94, page 630. For this purpose, it will be preferred to use a sample holder 13 of precisely known diameter so that the above computation can be relied upon.

In connection with FIG. 2, pulses 30, 31, 60, and 61 are alternating current, high-frequency pulses. It is to be understood that a different mode of excitation may be employed. For example, as further illustrated in FIG. 2, a unidirectional pulse 100 may be employed for nutating nuclei from a polarized condition in the earth's magnetic field. Following the abrupt removal of the field 100, an alternating field 101 will then be applied so that the nuclei in the field $H_0$ will then precess and attain a phase relationship for the production of the spin-echo pulse 102. The amplitude of pulse 102 may then be measured by receiver 20, FIG. 1. A program of excitation and measurement may thus be repetitively carried out through application of pulses 100', 101', and the measurement of pulse 102'. By this means, as well as through the use of A.C. pulses 30, 31, etc., echo pulses may be established for measurement.

Having described the invention in connection with certain embodiments thereof, it is to be understood that further modifications may now suggest themselves to those skilled in the art and it is intended to cover such modifications as fall within the scope of the appended claims.

What is claimed is:

1. In a system in which nuclei of a sample of material are polarized in a unidirectional magnetic field, the combination which comprises means including a first coil means for establishing magnetic fields in said material at a substantial angle to said unidirectional magnetic field for nutating nuclei and for detecting echo signals due to precession of said nuclei, measuring means connected to said first coil means for generating a signal representative of the logarithm of the amplitude of said echo, signals, field means for establishing a gradient in said unidirectional magnetic field in said sample, means for controlling said field means, and means responsive to the controlling means and to said measuring means to register said signals along a first scale representative of the logarithm of the amplitude of said signals from said nuclei as a dependent variable along a scale representative of the square of the gradient in said unidirectional magnetic field as the independent variable.

2. In a system in which nuclei of a sample of material are polarized in a unidirectional magnetic field, the combination which comprises means including a first coil means for establishing magnetic fields in said material at a substantial angle to said unidirectional magnetic field and for detecting echo signals due to precession of said nuclei, measuring means connected to said first coil means for generating a signal representative of the amplitude of said echo signals, second coil means positioned adjacent to said sample and a source of unidirectional current interconnected with said second coil means for modifying the unidirectional magnetic field in said sample in dependence upon current flow therethrough, and a recording unit including control means connected to said measuring means, to said second coil means, and to said first coil means for programing variations in the gradient of said unidirectional magnetic field and for registering conditions representative of the variations in the amplitude of said echo signals in correlation with the square of the gradient in said unidirectional magnetic field as modified by current flow through said second coil means.

3. In the measurement of the self-diffusion constant of a material including nuclei which are polarized in a unidirectional magnetic field having a gradient $G_1$, the method which comprises generating a first pair of magnetic fields spaced a given time interval and oriented at a substantial angle to said unidirectional magnetic field to produce a first free precession echo signal from said nuclei, detecting said first echo signal for generating a first output signal, registering a first condition representative of the logarithm of the amplitude of said first output signal in correlation with the square of the magnitude of said gradient $G_1$, establishing a second gradient $G_2$ in said unidirectional magnetic field, generating a second pair of magnetic fields with said time interval therebetween and oriented at a substantial angle to said unidirectional magnetic field to produce a second free precession echo signal from said nuclei, detecting said second echo signal for generating a second output signal, and registering a second condition representative of a logarithmic representation of said second output signal in correlation with the square of the magnitude of said gradient $G_2$ whereby the self-diffusion constant of said material is proportional to the slope of the function relating the logarithms of said first and second output signals and the squares of said gradient of $G_1$ and $G_2$.

4. The method of measuring the self-diffusion constant of a material including nuclei which are polarized in a unidirectional magnetic field having a gradient $G_1$ which comprises generating a first train of pairs of magnetic field pulses with a predetermined time interval between the pulses with each pair of pulses having a predetermined orientation at a substantial angle to said unidirectional magnetic field to produce a free precession echo signal from said nuclei following each of said pairs, detecting each said echo signal for generating a first output signal primarily dependent upon the maximum amplitude of said echo signal, registering said first output signal in correlation with the square of the gradient $G_1$, establishing a second gradient $G_2$ in said unidirectional magnetic field, generating a second train of pairs of magnetic field pulses having said predetermined time interval between the pulses of each of said pairs of second train and having said orientation to produce a free precession echo signal from said nuclei following each of said pairs in said second train of pulses, detecting the latter signal for generating a second output signal, and registering said second output signal in correlation with the square of the magnitude of said gradient $G_2$ whereby the slope of the function interrelating said output signal and said gradients is proportional to the self-diffusion constant of said materials.

5. In the measurement of the self-diffusion constant of a material including nuclei which are polarized in a unidirectional magnetic field having a gradient $G_1$, the method which comprises generating a first pair of magnetic field pulses spaced a given interval in time and oriented at a substantial angle to said unidirectional magnetic field, detecting an echo signal following the second of said pulses by an interval of time equal to said given interval to produce a first output signal, registering said first output signal in correlation with the square of the magnitude of said gradient $G_1$, establishing a second gradient $G_2$ in said unidirectional magnetic field, generating a second pair of magnetic field pulses of like time and space orientation as said first pair of pulses, detecting an echo signal following the second of said pair of pulses by an interval equal to said given interval to produce a second output signal, and registering said second output signal in correlation with the square of the magnitude of said gradient $G_2$ whereby the self-diffusion constant of said material is proportional to the slope of the function relating the logarithms of said first and second output signals and the squares of said gradient of $G_1$ and $G_2$.

6. The method of measuring the self-diffusion constant of a material including nuclei which are polarized in a unidirectional magnetic field having a gradient $G_1$ which comprises, (a) generating a first pair of magnetic field pulses spaced a given time interval one from another and oriented at a substantial angle to said unidirectional field to produce a first free precession echo signal from said nuclei, (b) detecting said first echo signal to generate a first output signal, (c) registering a first condition representative of the logarithm of the amplitude of said first output signal as a first ordinate along a spaced scale having abscissae in terms of the square of said gradient, including said gradient $G_1$, (d) establishing a second gradient $G_2$ in said unidirectional field, (e) generating a second pair of magnetic field pulses with said time interval therebetween and orientating at a substantial angle to said unidirectional field to produce a second free precession echo signal from said nuclei, (f) detecting said echo signal for generating a second output signal, (g) registering a second condition representative of the logarithm of the amplitude of said second output signal as a second ordinate along said space scale at an abscissa representative of the square of said gradient $G_2$ whereby the self-diffusion constant of said material is proportional to the slope of a line interconnecting said first ordinate and said second ordinate.

References Cited in the file of this patent

UNITED STATES PATENTS

| 2,705,790 | Hahn | Apr. 5, 1955 |
| 2,757,359 | Anderson et al. | July 31, 1956 |

OTHER REFERENCES

Carr et al.: Physical Review, vol. 94, No. 3, May 1, 1954, pp. 630 to 638.

Douglass et al.: Journal of Physical Chemistry, vol. 62, No. 9, September 4, 1958, pp. 1102 to 1107.

Fernbach et al.: Journal of Applied Physics, vol. 26, No. 2, February 1958, pp. 170–181 inclusive.